UNITED STATES PATENT OFFICE.

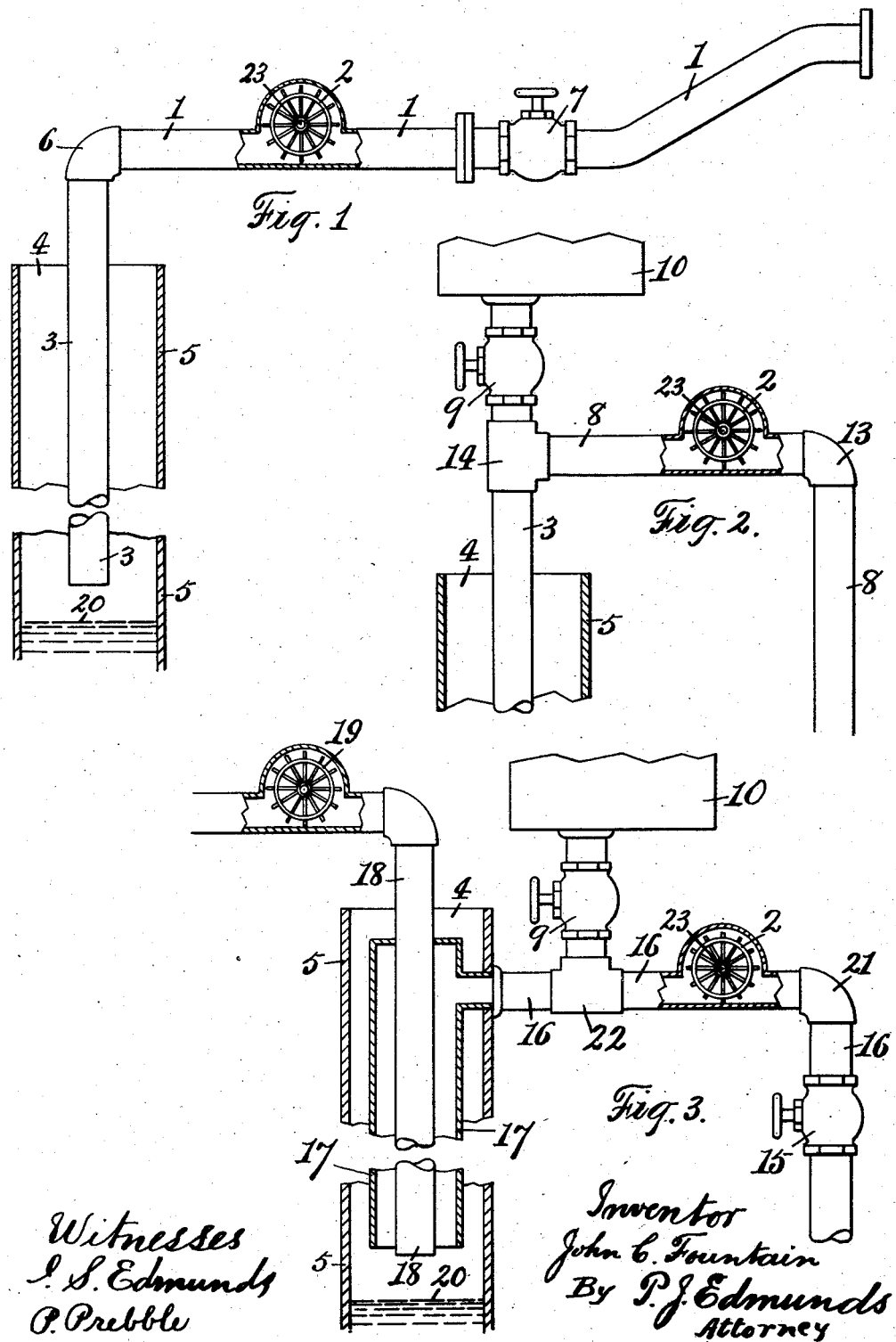

JOHN C. FOUNTAIN, OF PARKHILL, ONTARIO, CANADA.

METHOD OF AND MEANS FOR UTILIZING WATER IN DRIVEN OR DRIVE WELLS TO GENERATE POWER.

1,010,609.  Specification of Letters Patent.  Patented Dec. 5, 1911.

Application filed April 15, 1909. Serial No. 490,165.

*To all whom it may concern:*

Be it known that I, JOHN C. FOUNTAIN, a subject of the King of Great Britain, and a resident of Parkhill, in the county of Middlesex, in the Province of Ontario, Canada, have invented a new and useful Method of and Means for Utilizing Water in Driven or Drive Wells to Generate Power, of which the following is a specification.

This invention relates to a hole or shaft sunk into the earth into which water is supplied by a spent water pipe, which water leaves the shaft below the outlet of the spent water pipe through the medium of a conduit or a subterranean passage. And it consists of the improved construction and novel combination of parts of the same as will be hereinafter first fully set forth and described and then pointed out in the claims, reference being had to the accompanying drawings forming part of the specification wherein;—

Figure 1 is a side elevation partly in section of one form of the invention. Fig. 2 is a like view of a modified form. Fig. 3 is another modification of Fig. 1 showing an air pipe attached thereto.

In the accompanying drawings forming part of this specification the numeral 1 indicates the induction or intake pipe, 2 a turbine wheel and 3 an eduction or outlet pipe which takes away the spent water.

4 indicates the well hole or shaft the upper part of which is supplied with a lining 5.

6 is an elbow coupling between the pipes 1 and 3, and 7 is a valve in the pipe 1.

In Fig. 1 the water runs from the river, not shown, into the induction or intake pipe 1, and the valve 7 regulates the amount of water passing through said induction or intake pipe 1.

In Fig. 2 there is an induction or intake pipe 8 leading upward from the river, not shown, and Fig. 2 has a valve 9 and a reservoir 10, which valve 9 regulates the amount of water passing from said reservoir 10. Fig. 2 also has the elbow coupling 13 which connects the angular arms of the induction or intake pipe 8 together, and a T-coupling 14 which connects the induction or intake pipe 8 with the eduction or spent water pipe 3.

Fig. 3 has a valve 15 on the induction or intake pipe 16 leading upward from the river, not shown, and a pipe 17 of different form from the spent water pipe 3, but used for the same purpose and closed at the upper end. This pipe 17 has an air pipe 18 passing through it, which pipe 18 is tightly closed at the point where it passes through the pipe 17 and said pipe 18 is preferably provided with a turbine wheel 19. 20 indicates the water which may be at any suitable point below the spent water pipe 3, in Figs. 1 and 2, and below the pipes 17 and 18 in Fig. 3.

In Fig. 3 the elbow coupling 21 couples the angular branches of the induction or intake pipe 16 together and the T-coupling 22 couples the reservoir 10 to the pipe 16.

In Fig. 1 the water from the river, not shown, which is situated above the pipe 1, flows down through the pipe 1, and while flowing down through said pipe the flow of the water is regulated by the valve 7, and as the water flows down through the pipe 1, it revolves or operates the wheel 2, and the spent water flows on and down the pipe 3 into the well 4, and while in this pipe 3 the spent water forms a tail race down which it flows, and said spent water forms a suction on the water in the pipe 1 passing the wheel 2 and greatly increases the effect or weight of the water. And as the water flows down the pipe 3 in a well hole or shaft 4, this water has a clear vent from the bottom of the pipe 3 to the top of said well hole or shaft 4, and the water passes away through a conduit or subterranean passage. So that the weight of or the vacuum caused by the spent water in the pipe or tail race 3 has a great effect on the water in the pipe 1, and the greater the depth of the waste or spent water pipe 3 the greater will be the effect of the vacuum on the water in the pipe 1. This wheel 2 is connected by a shaft 23 to a pulley, not shown, outside of the pipe 1.

When the device shown in Fig. 2 is used the valve 9 is first opened, this permits the water from the reservoir 10 to pass down through the spent or waste water pipe 3, and when sufficient water has passed down the pipe 3 to form a vacuum therein the valve 9 is closed, the vacuum in the pipe 3 then acts as a siphon which draws the water upward through the induction or intake pipe 8 and past the wheel 2, where it turns the latter, after which the spent water passing down through the spent water pipe 3 as before described, forms a vacuum in said pipe 8, which continues the flow of the water. The upright arm of this induction or intake pipe 8 may have a valve in it to regulate the flow of water through it to the pipe 3 if desired.

When the device shown in Fig. 3 is used the valve 9 is first opened as before described, and the water from the reservoir 10 passes down through the spent or waste water pipe 17, the top of the latter being closed, and when sufficient water has passed down through said pipe 17 to form a vacuum therein the valve 9 is closed, after which the valve 15 is opened and the vacuum creates a suction which acts as a siphon and draws the water upward through the induction or intake pipe 16 and past the wheel 2, where it turns the latter, after which the spent water passing down through said pipe 17, forms a suction or vacuum in said pipe 16, which continues the flow of the water. In addition to the spent water pipe 17, the air pipe 18 projects down through the water pipe 17, and the latter tightly closes on the air pipe 18, so that the spent water passing from the pipe 17 past the end of said air pipe 18 forms a suction or vacuum at said end of said air pipe 18 which draws the air in through the said pipe 18 and past the wheel 19 where said air turns the latter. The water 20 passes on to the natural subterranean passage, and the well hole or shaft 4 forms a vent for said water and air. So that said driven or drive well forms a source of power, and the greater the depth at which the vacuum is formed, or that the spent water pipes extend into said well hole or shaft 4 the greater will be the power, and said device at the same time forms a simple, inexpensive and efficient device for the purpose intended.

While in the drawings forming part of this specification, there is illustrated one form of construction, embodying this invention, which is preferred it is understood that the elements therein shown may be varied or changed as to shape, proportion, and exact manner of assemblage without departing from the spirit of this invention.

Having thus described my invention, I claim:—

1. In a device of the class described, an upwardly directed intake pipe, a valve in said intake pipe, a reservoir and a valve governing said reservoir, a siphon outlet pipe communicating with said reservoir and said intake pipe, an air pipe, and a wheel in said air pipe, in combination with a well hole or shaft, and a vent between the outer side of said siphon outlet pipe and the inner side of said well hole or shaft, to permit the water to flow to a subterranean passage below the surface of the earth, substantially as shown and described and for the purpose specified.

2. In a device of the class described, an upwardly directed intake pipe, a wheel in said intake pipe, a reservoir and a valve governing said reservoir, a siphon outlet pipe communicating with said reservoir and said intake pipe, an air pipe, and a wheel in said air pipe, in combination with a well hole or shaft, and a vent between the outer side of said siphon outlet pipe and the inner side of said well hole or shaft, to permit the water to flow to a subterranean passage below the surface of the earth, substantially as shown and described and for the purpose specified.

3. In a device of the class described, an upwardly directed intake pipe, a wheel and valve in said intake pipe, a reservoir and a valve governing said reservoir, a siphon outlet pipe communicating with said reservoir and said intake pipe, an air pipe extending down through said siphon outlet pipe, a wheel in said air pipe, in combination with a well hole or shaft, and a vent between the outer side of said siphon outlet pipe and the inner side of said well hole or shaft, to permit the water to flow to a subterranean passage below the surface of the earth, substantially as shown and described and for the purpose specified.

In testimony whereof, I have signed in the presence of the two undersigned witnesses.

JOHN C. FOUNTAIN.

Witnesses:
 P. J. EDMUNDS,
 I. S. EDMUNDS.

---

Copies of this patent may be obtained for five cents each, by addressing the "Commissioner of Patents, Washington, D. C."